United States Patent [19]

Tanaka

[11] Patent Number: 4,975,590
[45] Date of Patent: Dec. 4, 1990

[54] ENERGY SUBTRACTION PROCESSING CASSETTE

[75] Inventor: Hiroshi Tanaka, Kanagawa, Japan

[73] Assignee: Fuji Photo Film Co., Ltd., Kanagawa, Japan

[21] Appl. No.: 360,683

[22] Filed: Jun. 2, 1989

[30] Foreign Application Priority Data

Jun. 2, 1988 [JP] Japan ................... 63-136001

[51] Int. Cl.⁵ ............................................. G03B 42/04
[52] U.S. Cl. .................... 250/484.1; 206/455; 250/327.2; 378/185
[58] Field of Search ................. 250/327.2 A, 327.2 B, 250/327.2 C, 327.2 J, 484.1 B; 378/185; 206/455

[56] References Cited

U.S. PATENT DOCUMENTS

| 3,836,783 | 9/1974 | Stievenart et al. | 378/188 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,400,619 | 8/1983 | Kotera et al. | 250/327.2 |
| 4,710,875 | 12/1987 | Nakajima et al. | 364/413.23 |
| 4,810,874 | 3/1989 | Torii | 250/327.2 |
| 4,827,136 | 5/1989 | Bishop, Jr. et al. | 250/484.1 |
| 4,855,598 | 8/1989 | Ohgoda et al. | 250/327.2 |

FOREIGN PATENT DOCUMENTS

| 71745 | 5/1916 | Austria | 378/185 |
| 0108982 | 5/1984 | European Pat. Off. | 250/484.1 B |
| 56-11395 | 2/1981 | Japan | 250/327.2 |
| 56-12599 | 2/1981 | Japan . | |
| 56-104645 | 8/1981 | Japan . | |

Primary Examiner—Constantine Hannaher
Attorney, Agent, or Firm—Sughrue, Mion, Zinn, Macpeak & Seas

[57] ABSTRACT

An energy subtraction processing cassette accommodates therein a pair of stimulable phosphor sheets and a radiation energy changing filter interposed between the stimulable phosphor sheets. The cassette includes a cassette body which is formed of a light-shielding material that transmits radiation and a lid member mounted on the cassette body. A side wall of the cassette perpendicular to the stimulable phosphor sheets accommodated therein is provided with a slit through which the radiation energy changing filter can be inserted into and from which it can be drawn out of the cassette without the lid member having to be opened or closed.

7 Claims, 2 Drawing Sheets

F I G. 1
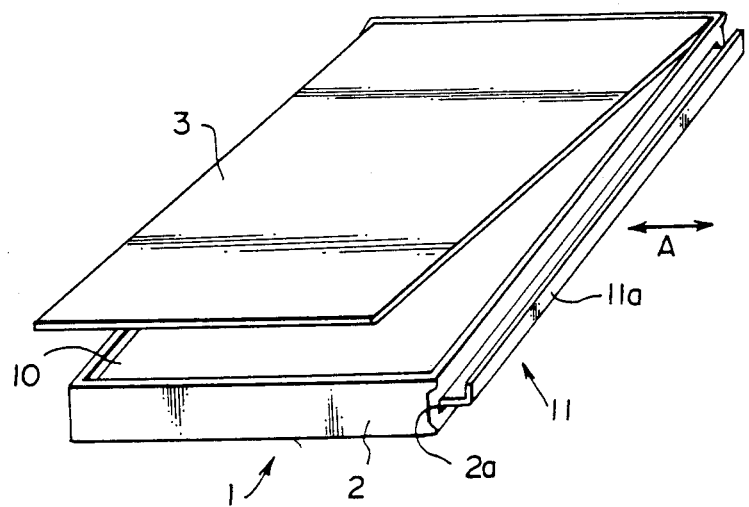
F I G. 2
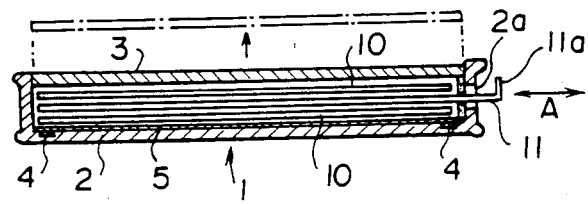
F I G. 3
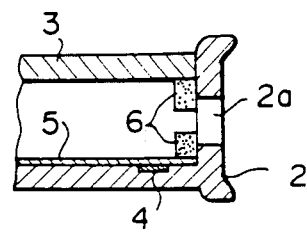

ENERGY SUBTRACTION PROCESSING CASSETTE

BACKGROUND OF THE INVENTION

1. Field of the Invention

This invention relates to a cassette which is employed in a radiation image recording and reproducing system, and more particularly to an energy subtraction processing cassette which is used in a so-called energy subtraction process in a radiation image recording and reproducing system.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to radiation is exposed to stimulating rays such as visible light, light is emitted by the phosphor in proportion to the amount of energy stored therein during exposure to radiation. A phosphor exhibiting such properties is referred to as a stimulable phosphor.

It has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to an electric image signal, image processing is carried out on the electric image signal, and the radiation image of the object is reproduced as a visible image by use of the processed image signal on a recording medium such as a photographic film, a display device such as a cathode ray tube (CRT), or the like. (See, for instance, Japanese Unexamined Patent Publication No. 56(1981)-104645 and 56(1981)-11395) U.S. Pat. Nos. 4,258,264, 4,276,473, 4,315,318. In such a radiation image recording and reproducing system, the stimulable phosphor sheet is used as an intermediate recording medium and temporarily carries the radiation image until it delivers the radiation image to the final recording medium. Accordingly, the stimulable phosphor sheet can be reused repeatedly, and it is preferable from the viewpoint of economy that the stimulable phosphor sheet be reused repeatedly.

In order for the stimulable phosphor sheet to be reused, it is exposed to heat or radiation after it is exposed to the stimulating rays and the light emitted therefrom has been detected. The exposure to heat or radiation causes it to release any residual energy stored thereon, as disclosed, for instance, in Japanese Unexamined Patent Publication Nos. 56(1981)-11392 and 56(1981)-12599 and U.S. Pat. No. 4,400,619.

There has been known a subtraction process for a radiation image in which a pair of radiation images which have been recorded under different conditions are photoelectrically read out, whereby digital image signals representing the radiation images are obtained. The digital image signals are then subjected to a subtraction process in which the values of the digital image signals representing corresponding picture elements in the two radiation images are subtracted from each other, whereby a difference image signal is obtained which represents the image of a specific structure in the radiation images. By the use of the difference image signals thus obtained, a radiation image of a specific structure can be extracted from an original image in which it is embedded.

Basically, the subtraction process is carried out by either a so-called temporal (time difference) subtraction processing method or a so-called energy subtraction processing method. In the former method, the image of a specific structure is extracted by subtraction of the image signal of a radiation image recorded without injection of a contrast medium from the image signal of a radiation image in which the image of the specific structure is emphasized by injection of a contrast medium. In the latter method, two recording media are exposed to radiations which have different energy distributions and have passed through the same object, whereby two radiation images respectively containing the images of the specific structure are obtained. Then the image signals of the two radiation images are weighted appropriately, if necessary, and subjected to the subtraction, whereby the image of the specific structure is extracted.

Since the subtraction process is extremely effective for diagnostic purposes, it has recently attracted much attention, and research has been continued by the use of electronic technology to develop improved methods. In the aforesaid radiation image recording and reproducing system in which a stimulable phosphor sheet is used as an intermediate recording medium, information about the radiation image recorded on the stimulable phosphor sheet is directly read out in the form of an electric image signal, and accordingly, the subtraction process can be easily carried out. When stimulable phosphor sheets are used and the energy subtraction process is carried out, two radiation images containing therein different images of a specific structure can be obtained at one time if a pair of stimulable phosphor sheets with a radiation energy changing filter sandwiched therebetween is exposed to radiation which has passed through an object (so-called one-shot energy subtraction).

During the recording of the radiation image of an object on a stimulable phosphor sheet, the stimulable phosphor sheet, which is exposed to radiation which has passed through the object, is accommodated in a light-shielding cassette casing which freely transmits the radiation. When the one-shot energy subtraction process is carried out, a pair of stimulable phosphor sheets are accommodated in a cassette casing with a radiation energy changing filter sandwiched therebetween and exposed to a radiation which has passed through the object.

FIG. 5 shows a conventional energy subtraction processing cassette. The cassette 101 can accommodate a pair of stimulable phosphor sheets 10 and a radiation energy changing filter 111 such as a copper plate. The energy changing filter 111 is interposed between the stimulable phosphor sheets 10, and the cassette 101 comprises a cassette body 102, which is formed of a light-shielding material that transmits radiation, and a lid member 103 which is mounted on the cassette body 102. The stimulable phosphor sheets 10 are loaded into the cassette 101 so that the stimulable phosphor layers of both the sheets 10 face away from the lid member 103. When recording is effected, the lid member 103 is closed and the cassette 101, with the cassette body side facing a radiation source 12, is exposed to radiation 12a which has passed through an object 13. Thus, images of the object are recorded on the stimulable phosphor sheets under different conditions. After the recording is completed, the stimulable phosphor sheets are transferred to an image read-out apparatus, and the radiation image information is read out. When markers 104 are provided on the surface of the cassette body 102, images of the markers 104 are recorded on the stimulable phosphor sheets 10 simultaneously with the images of the object 13, and the image signals corresponding to the images of the marker 104 recorded on the respective stimulable phosphor sheets can be used as reference signals. With the aid of the reference signals, the picture elements on one stimulable phosphor sheet which match picture elements on the other stimulable phosphor sheet (and therefore which the image signal components representing those picture elements correspond to each other) can be easily determined during the energy subtraction process.

The image read-out apparatus is connected to a loader which holds the cassette and takes the stimulable phosphor sheets out of the cassette or is provided with such a loader built therein. However, in the case of the energy subtraction processing cassette, a loader cannot be used due to the radiation energy changing filter. Accordingly, conventionally, the stimulable phosphor sheets must be manually taken out of the energy subtraction processing cassette and loaded into a cassette or a magazine without a radiation energy changing filter in a darkroom, the cassette with the stimulable phosphor sheets thereafter being delivered to the loader.

SUMMARY OF THE INVENTION

In view of the foregoing observations and description, the primary object of the present invention is to provide an improved energy subtraction processing cassette which can be delivered to a loader without necessity for the stimulable phosphor sheets to be transferred to a different cassette.

The energy subtraction processing cassette in accordance with the present invention is characterized in that a side wall perpendicular to the stimulable phosphor sheets accommodated in the cassette is provided with a slit through which the radiation energy changing filter can be inserted and from which it can be drawn out without a lid member having to be opened or closed.

In the case of the energy subtraction processing cassette, the cassette is fed to the loader after an image is recorded. In the loader, the lid member is opened and the stimulable phosphor sheet, which is positioned nearer to the lid member, is taken out. Then the cassette is taken out of the loader, and the radiation energy changing filter is drawn out of the cassette through the slit. This operation can be effected at any desired place. After the radiation energy changing filter is drawn out, the cassette is fed to the loader again and the other stimulable phosphor sheet is taken out of the cassette in the loader. Accordingly, with this cassette, the operation in the darkroom can be eliminated.

BRIEF DESCRIPTION OF THE DRAWINGS

FIG. 1 is a perspective view showing an energy subtraction cassette in accordance with an embodiment of the present invention, FIG. 2 is a cross-sectional view of the cassette, FIG. 3 is an enlarged view of a part of the cassette.

DESCRIPTION OF THE PREFERRED EMBODIMENT

Figure 4:
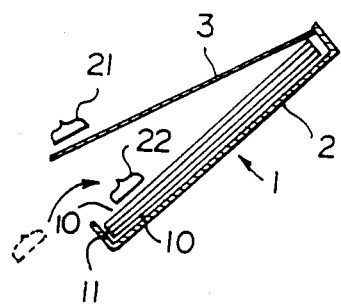
FIG. 4 is a schematic view showing the state of the cassette when it is in a loader.

As shown in FIGS. 1 and 2, an energy subtraction processing cassette 1 in accordance with an embodiment of the present invention comprises a cassette body 2, which can accommodate a pair of stimulable phosphor sheets 10 and a radiation energy changing filter 11, which is to be interposed between the stimulable phosphor sheets 10, and a lid member 3 which is mounted on the cassette body 1 in such a way that it can be opened and closed. Though, in FIGS. 1 and 2, the cassette 1 is shown with the lid member 3 directed upward for the purpose of simplicity of illustration, the recording is effected with the bottom side (the side opposite to the lid member 3) of the cassette body 2 opposed to the radiation source (not shown). The stimulable phosphor sheets 10 are loaded into the cassette 1 with the stimulable phosphor layers thereon facing the bottom side of the cassette body 2.

A slit 2a through which the radiation energy changing filter 11 is inserted into and from which it is drawn out of the cassette body 1 in the direction of arrow A is formed in a side wall of the cassette body 1. The radiation energy changing filter 11 should be of such a size that an end portion of the filter projects outside the cassette 1 when the filter 11 is inserted into the cassette 1. However, it is preferable for the end of the filter 11 to be bent so that it forms a handle 11a as shown in FIG. 2, whereby the insertion and removal of the filter 11 is facilitated.

Prior to recording, the lid member 3 is first opened as shown in FIG. 1, and a first stimulable phosphor sheet 10 is loaded into the cassette body 2 with the stimulable phosphor layer directed toward the bottom side of the cassette body 2. This operation may be effected either manually or by the use of a known feeder. In order to prevent the stimulable phosphor layer on the first sheet 10 from being scratched by the surface of the inner wall of the cassette body 2 when the first stimulable phosphor sheet 10 is loaded into the cassette 1, a cushioning sheet 5 is bonded to the inner surface of the bottom side of the cassette body 2 as shown in FIG. 3. After the first stimulable phosphor sheet 10 has been loaded into the cassette body 2, the radiation energy changing filter 11 is inserted into the cassette body 2 through the slit 2a. The width of the slit 2a is slightly larger than the thickness of the radiation energy changing filter 11, and a pair of light-shielding sponge strips 6 are bonded to the side wall of the cassette body 2 on the upper and lower sides of the slit 2a and are spaced from each other by a distance which is slightly smaller than the thickness of the radiation energy changing filter 11. Accordingly, the radiation energy changing filter 11 compresses the sponge strips 6 as it is inserted into the cassette body. Thereafter, a second stimulable phosphor sheet 10 is loaded into the cassette body 11 with the stimulable phosphor layer thereon facing the bottom side of the cassette body 2. Then the lid member 3 is closed and the cassette 1 is subjected to recording.

Figure 5:
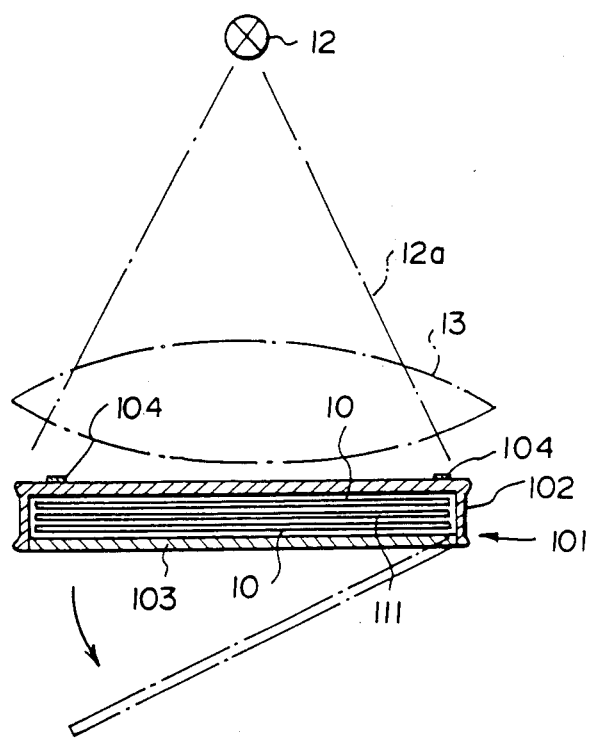
FIG. 5 is a cross-sectional view showing a conventional energy-subtraction cassette.

During recording, the bottom side of the cassette 1 is opposed to the radiation source with an object intervening therebetween so that the cassette 1 is exposed to radiation which has passed through the object. Since the radiation energy changing filter 11 intervenes between the two stimulable phosphor sheets 10, the stimulable phosphor sheets 10 nearer to the radiation source is exposed to radiation containing therein so-called soft radiation, and the other sheet 10 is exposed to radiation minus the soft radiation. Accordingly, different images of the object are respectively recorded on the stimulable phosphor sheets 10. A pair of markers 4 are embedded in the inner wall surface of the bottom side of the cassette body 2. With this arrangement, the markers 4 can be positioned nearer to the stimulable phosphor sheets 10 than they are in the conventional cassette shown in FIG. 5, where the markers are bonded to the outer surface of the cassette, and accordingly, accuracy in locating the starting point of the image signals can be improved. When the recording is completed, the radiation images respectively stored in the stimulable phosphor sheets 10 are read out by an image read-out apparatus.

The image read-out apparatus is provided with a loader which takes the stimulable phosphor sheets 10 out of the cassette 1. In the loader, the lid member 3 is opened by a lid opening means 21 which may comprise a suction cup, for instance. After the lid member 3 is open, a sheet picking-up means 22 (which may comprise a suction cup) enters the cassette body 2 and takes the sheet 10 nearer to the lid member 3 out of the cassette body 2. Then the sheet picking-up means 22 delivers the sheet 10 to a sheet conveyance means (not shown) or the like which conveys the sheet 10 to an image read-out section of the image read-out apparatus. When picking up the sheet 10, the sheet picking-up means 22 is brought into contact with the side of the sheet 10 opposite to the side on which the stimulable phosphor layer is formed. After one of the sheets 10 is taken out, the lid member 3 is closed and the cassette 1 is taken out of the loader. Then the radiation energy changing filter 11 is drawn out of the cassette 1. This operation may be effected in a room with normal lighting. When the radiation energy changing filter 11 is drawn out, a small amount of light enters the cassette 1 through the slit 2a. However, since the stimulable phosphor layer faces the bottom side of the cassette body 2, the image recorded on the stimulable phosphor sheet 10 cannot be fogged by the light. Further, though the trailing end of the radiation energy changing filter 11 can scratch the sheet 10, no problem arises practically since the radiation energy changing filter 11 cannot come into contact with the stimulable phosphor layer. After the filter 11 is drawn out, the cassette 1 is fed into the loader again, and the stimulable phosphor sheet 10 remaining in the cassette 1 is taken out in the manner described above.

The sheets 10 which have been taken out of the cassette 1 are conveyed to the read-out section. The read-out of the radiation images and the processing of the image signals obtained through the read-out ar well known and will not be described here.

I claim:

1. An energy subtraction processing cassette which can accommodate therein a pair of stimulable phosphor sheets positioned parallel to each other and a radiation energy changing filter which is interposed between the stimulable phosphor sheets, each stimulable phosphor sheet consisting of a base material bearing thereon a stimulable phosphor layer, said cassette comprising:
    a lid member; and
    a side wall perpendicular to a pair of stimulable phosphor sheets accommodated therein, said side wall being provided with a slit through which a radiation energy changing filter can be inserted into and from which it can be drawn out of the cassette without the lid member having to be opened or closed.

2. An energy subtraction processing cassette as defined in claim 1 in which said radiation energy changing filter is of such a size that an end portion thereof projects outside the cassette when it is inserted into the cassette.

3. An energy subtraction processing cassette as defined in claim 2 in which the end portion of the filter is bent so that it forms a handle.

4. An energy subtraction processing cassette as defined in claim 1 in which a cushioning member is provided on the inner surface of the side of the cassette with which the stimulable phosphor layer can come into contact.

5. An energy subtraction processing cassette as defined in claim 1 in which the width of the slit is slightly larger than the thickness of the radiation energy changing filter and a pair of light-shielding elastic material strips are bonded to the side wall of the cassette on opposite sides of the slit and are spaced from each other by a distance which is slightly smaller than the thickness of the radiation energy changing filter.

6. An energy subtraction processing cassette as defined in claim 5, wherein said pair of light-shielding elastic material strips comprise a sponge-like material.

7. An energy subtraction processing cassette as defined in claim 1 in which a marker is embedded in the side of the cassette which is to face a radiation source when the stimulable phosphor sheets are exposed to radiation which has passed through an object.

* * * * *